United States Patent
Strashny et al.

(10) Patent No.: US 10,717,344 B2
(45) Date of Patent: Jul. 21, 2020

(54) HEATING AND COOLING SYSTEM FOR A VEHICLE

(71) Applicant: PERKINS ENGINES COMPANY LIMITED, Eastfield (GB)

(72) Inventors: Igor Strashny, Peterborough (GB); Paul Moore, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 526 days.

(21) Appl. No.: 15/307,235

(22) PCT Filed: May 11, 2015

(86) PCT No.: PCT/EP2015/060385
§ 371 (c)(1),
(2) Date: Oct. 27, 2016

(87) PCT Pub. No.: WO2015/173201
PCT Pub. Date: Nov. 19, 2015

(65) Prior Publication Data
US 2017/0120726 A1 May 4, 2017

(30) Foreign Application Priority Data
May 16, 2014 (EP) .................................... 14168706

(51) Int. Cl.
*B60H 1/32* (2006.01)
*B60H 1/22* (2006.01)
(Continued)

(52) U.S. Cl.
CPC ......... *B60H 1/3201* (2013.01); *B60H 1/2212* (2013.01); *B60H 1/32014* (2019.05);
(Continued)

(58) Field of Classification Search
CPC ........ B60H 1/02; B60H 1/036; B60H 1/2212; B60H 1/3201; F25B 17/083; F25B 17/08;
(Continued)

(56) References Cited

U.S. PATENT DOCUMENTS 1,908,413 A * 5/1933 Elfving .................. F25B 17/086
62/481
2,410,547 A * 11/1946 McCollum ........... B60H 1/2212
126/110 R
(Continued)

FOREIGN PATENT DOCUMENTS

| CN | 1180626 | 7/1997 |
|---|---|---|
| CN | 1403765 | 3/2003 |

(Continued)

OTHER PUBLICATIONS

International Search Report Application No. PCT1EP2015/060385; reported on Aug. 21, 2015.
(Continued)

*Primary Examiner* — Jianying C Atkisson
*Assistant Examiner* — Miguel A Diaz
(74) *Attorney, Agent, or Firm* — Miller, Matthias & Hull

(57) ABSTRACT

A heating and cooling system for a vehicle having an internal combustion engine is provided. The system comprises at least one exhaust pipe conveying exhaust gases away from the engine, and a reactor vessel located in the exhaust pipe and containing an absorbent salt and a refrigerant fluid. A condenser is in fluid communication with the reactor vessel, and receives refrigerant vapour from the reactor when exhaust gases heat the reactor vessel in the exhaust pipe. An evaporator is locatable in a cab of the vehicle and is in fluid communication with the condenser and the reactor vessel. The evaporator receives condensed refrigerant from the condenser so as to cool the air surround- (Continued)

ing the evaporator, and returning refrigerant vapour to the reactor vessel. A method of cooling a driver environment of a vehicle having an internal combustion engine is also provided, as is a vehicle incorporating the heating and cooling system.

13 Claims, 2 Drawing Sheets

(51) Int. Cl.
  *F25B 17/08* (2006.01)
  *F25B 27/02* (2006.01)
(52) U.S. Cl.
  CPC ............ *F25B 17/083* (2013.01); *F25B 27/02* (2013.01); *Y02A 30/274* (2018.01)
(58) Field of Classification Search
  CPC ........ F25B 17/086; F25B 17/02; F25B 17/04; F25B 27/02; Y02A 30/274; Y02A 30/276; Y02A 30/277; Y02A 30/278
  See application file for complete search history.

(56) References Cited

U.S. PATENT DOCUMENTS

| | | | | |
|---|---|---|---|---|
| 2,428,066 A * | 9/1947 | Ellis | ............... | F28D 9/0018 165/166 |
| 3,253,641 A * | 5/1966 | Gutzeit | ............... | B60H 1/2212 431/41 |
| 4,199,959 A * | 4/1980 | Wurm | ............... | F24F 3/001 62/480 |
| 4,765,395 A * | 8/1988 | Paeye | ............... | F25B 17/083 165/104.12 |
| 4,924,676 A | 5/1990 | Maier-Laxhuber et al. | | |
| 5,222,375 A * | 6/1993 | Conrad | ............... | B60H 1/3202 62/241 |
| 5,333,471 A * | 8/1994 | Yamada | ............... | B60H 1/3201 62/476 |
| 5,335,519 A | 8/1994 | Bernier | | |
| 5,335,719 A * | 8/1994 | Khelifa | ............... | B60H 1/00007 165/42 |
| 5,359,864 A * | 11/1994 | Yamada | ............... | B60H 1/3201 62/430 |
| 5,360,057 A | 11/1994 | Rockenfeller et al. | | |
| 5,383,341 A * | 1/1995 | Zur | ............... | B60H 1/00007 62/476 |
| 5,901,572 A * | 5/1999 | Peiffer | ............... | B60H 1/00 165/104.12 |
| 5,901,780 A * | 5/1999 | Zeigler | ............... | B60H 1/032 123/142.5 R |
| 6,276,166 B1 * | 8/2001 | Sarkisian | ............... | B60H 1/00492 62/112 |
| 9,513,037 B2 * | 12/2016 | Barot | ............... | B62J 33/00 |
| 9,656,536 B2 * | 5/2017 | Zhou | ............... | B60H 1/3201 |
| 2006/0059933 A1 * | 3/2006 | Axakov | ............... | B60H 1/00 62/244 |
| 2006/0130469 A1 * | 6/2006 | Baeuerle | ............... | B60H 1/025 60/300 |
| 2011/0167864 A1 | 7/2011 | Gu | | |
| 2012/0060537 A1 | 3/2012 | Bolin | | |
| 2013/0319027 A1 * | 12/2013 | Tsubouchi | ............... | B60H 1/3201 62/238.3 |
| 2014/0047853 A1 * | 2/2014 | Zhong | ............... | B60H 1/3201 62/106 |
| 2015/0174988 A1 * | 6/2015 | Collmer | ............... | F24H 1/009 165/154 |
| 2015/0192049 A1 * | 7/2015 | Suzuki | ............... | F25B 17/08 60/300 |
| 2016/0257181 A1 * | 9/2016 | Zhou | ............... | B60H 1/3201 |
| 2017/0045276 A1 * | 2/2017 | Brauer | ............... | B60H 1/005 |
| 2017/0120725 A1 * | 5/2017 | Zhou | ............... | B60H 1/3201 |

FOREIGN PATENT DOCUMENTS

| | | |
|---|---|---|
| DE | 19545450 | 7/1997 |
| DE | 102011109384 | 8/2011 |
| EP | 0205167 | 12/1986 |
| EP | 0350764 | 1/1990 |
| EP | 350764 A1 * | 1/1990 |
| ES | 2159250 | 9/2001 |
| JP | S4727323 | 8/1972 |
| JP | S4727323 Y1 | 8/1972 |
| JP | S4927950 | 7/1974 |
| JP | S4927950 Y1 | 7/1974 |
| JP | S60135580 | 9/1985 |
| JP | S60135580 U | 9/1985 |
| JP | 2002225545 | 8/2002 |
| JP | 2002225545 A | 8/2002 |
| JP | 2003328724 | 11/2003 |
| JP | 2003328724 A | 11/2003 |
| JP | 2011237106 | 5/2010 |
| WO | 9000479 | 1/1990 |
| WO | WO 9000479 A2 | 1/1990 |
| WO | 2015173201 | 11/2015 |

OTHER PUBLICATIONS

European Search Report issued in related European Application No. 14168706.1-1756; dated Oct. 29, 2014.

Japanese Examination Report for Application No. JP 2016-565428 reported on Jun. 26, 2018.

* cited by examiner

HEATING AND COOLING SYSTEM FOR A VEHICLE

CROSS-REFERENCE TO RELATED APPLICATION

This Application is a 35 USC § 371 US National Stage filing of International Application No. PCl/EP2015/060385 filed on May 11, 2015, and claims priority under the Paris Convention to European Patent Application No. EP 14168706.1 filed on May 16, 2014.

FIELD OF THE DISCLOSURE

The present invention is concerned with heating and cooling systems for vehicles. More specifically, the present invention provides a system in which the exhaust gases of the vehicle engine are utilised for heating and cooling the operator cab or driver/passenger environment of the vehicle.

BACKGROUND OF THE DISCLOSURE

It is known for vehicle heating, cooling and air conditioning systems to use the waste heat of the engine exhaust as part of an absorption system in order to provide dehumidified warm or cold air to the interior of the vehicle. One such system is disclosed in U.S. Pat. No. 5,383,341, which discloses an absorption system in which a refrigerant-absorbent mixture is heated by the exhaust gases from the engine of the vehicle. The refrigerant-absorbent mixture is contained within a reactor vessel, and the mixture may comprise a sodium thiocyanate (NaSCN) salt acting as the absorbent and an ammonia ($NH_3$) solution acting as the refrigerant. The reactor vessel is heated by heat extracted from the engine exhaust gases which pass through an exhaust pipe.

The reactor vessel is remote from the exhaust pipe, with the heat from the exhaust gases transferred to the reactor by a plurality of heat pipes. Each heat pipe has an evaporator section which lies within the exhaust pipe and a condenser section which lies within the reactor vessel. The exhaust gases flow over and heat the evaporator sections of the heat pipes, which causes a volatile medium contained within each heat pipe to vaporise and flow towards the condenser section. The vapour condenses back into a liquid within the condenser sections of each pipe, thereby distributing the heat output into the refrigerant-absorbent mixture within the reactor vessel.

It is an aim of the present invention to provide an improved exhaust gas-driven absorption system for heating, cooling and conditioning air for the operator cab or driver/passenger environment of a vehicle.

SUMMARY OF THE DISCLOSURE

According to a first aspect of the invention there is provided a heating and cooling system for a vehicle having an internal combustion engine. The system comprises at least one exhaust pipe conveying exhaust gases away from the engine, and a reactor vessel located in the exhaust pipe. The reactor vessel contains an absorbent salt and a refrigerant fluid. The system further comprises a condenser in fluid communication with the reactor vessel, where the condenser receives refrigerant vapour from the reactor when exhaust gases heat the reactor vessel in the exhaust pipe. An evaporator is locatable in a driver environment of the vehicle and is in fluid communication with the condenser and the reactor vessel, the evaporator receiving condensed refrigerant from the condenser so as to cool the air surrounding the evaporator, and returning refrigerant vapour to the reactor vessel.

According to a second aspect of the invention there is provided a vehicle comprising an internal combustion engine and a heating and cooling system in accordance with the first aspect of the invention.

According to a third aspect of the invention there is provided a method of cooling a driver environment of a vehicle having an internal combustion engine. The method comprises the steps of providing at least one exhaust pipe for conveying exhaust gases away from the engine, and locating a reactor vessel in the exhaust pipe, where the vessel contains an absorbent salt and a refrigerant fluid. A condenser is fluidly connected to the reactor vessel, such that the condenser receives refrigerant vapour from the vessel when exhaust gases heat the vessel in the exhaust pipe. An evaporator is located in the driver environment of the vehicle, and fluidly connected to the condenser and the reactor vessel, such that the evaporator receives condensed refrigerant from the condenser and cools the air surrounding the evaporator, and subsequently returns refrigerant vapour to the reactor vessel.

BRIEF DESCRIPTION OF THE DRAWINGS

A preferred embodiment of the present invention will now be described, by way of example only, with reference to the accompanying drawings.

DETAILED DESCRIPTION OF THE DISCLOSURE

Figure 1:
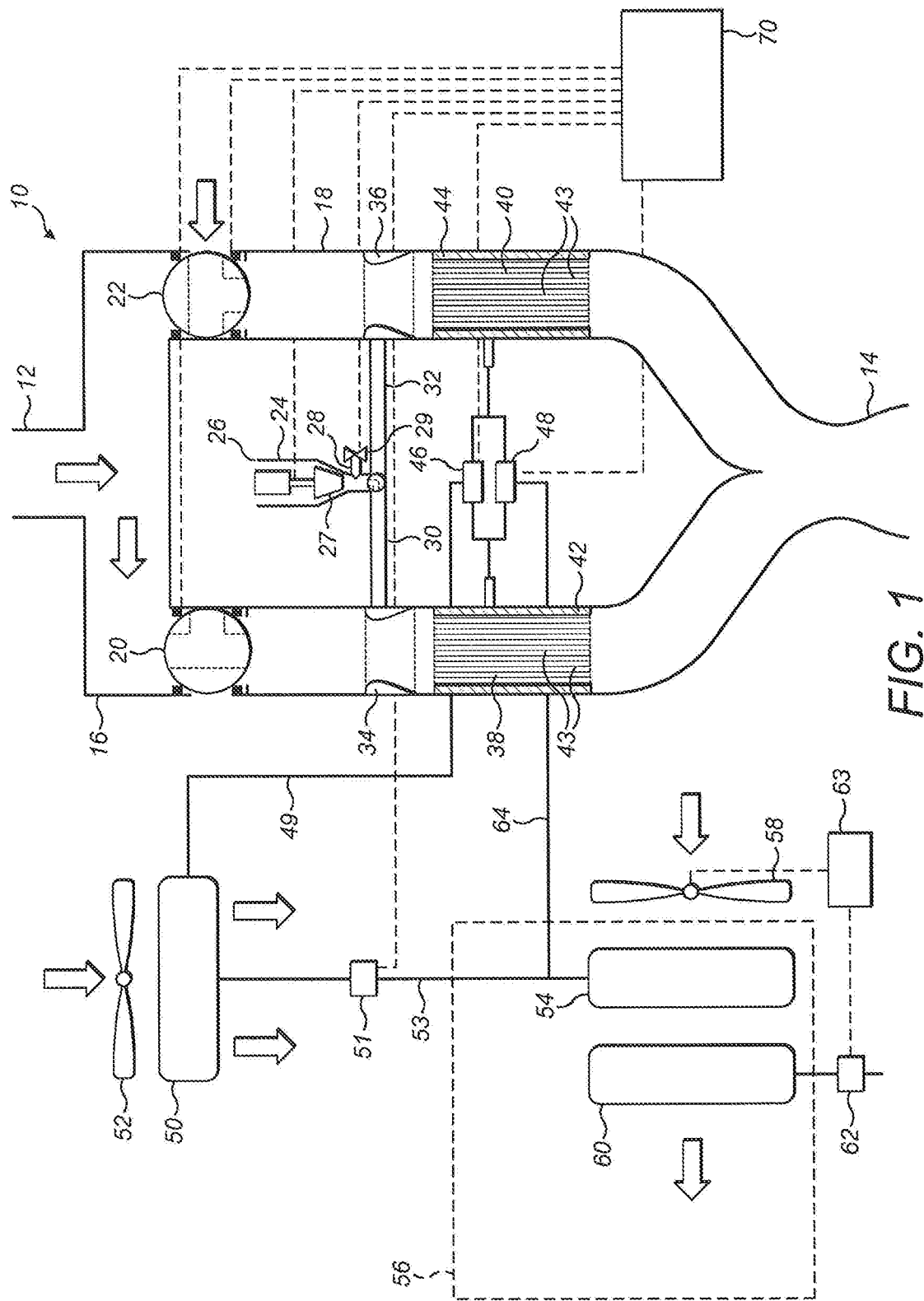
FIG. 1 is a schematic view of an absorption system for heating, cooling and conditioning air in a vehicle.

FIG. 1 shows in schematic form an absorption system for heating, cooling and conditioning air in a vehicle, where the system utilises the waste heat from engine exhaust gases. The engine exhaust gases flow along an exhaust conduit 10 which has an inlet 12 in communication with exhaust outlet ports of the vehicle's engine (not shown) and an outlet 14 which is in fluid communication with one or more tail pipes (not shown). The exhaust conduit 10 comprises first and second pipes 16, 18 which run parallel to one another from the inlet 12 to the outlet 14. Each pipe 16, 18 has an exhaust air inlet 20, 22 through which ambient air may be drawn in whilst closing the exhaust conduit 10 to exhaust gas flow. The exhaust air inlet 20 in the first exhaust pipe 16 is shown in an inlet closed/exhaust flow open position, and the exhaust air inlet 22 in the second exhaust pipe 18 is shown in an inlet open/exhaust flow closed position, although the respective positions of the inlets 20, 22 may be reversed as necessary. At least one of the inlets 20, 22 must be in its inlet closed/exhaust flow open position whilst the engine is running so that exhaust gases may continue to flow through the exhaust conduit 10.

An air/fuel burner 24 is in fluid communication with each exhaust pipe 16, 18 downstream of the air inlets 20, 22. Ambient air and fuel may enter the burner 24 through a burner air inlet 26 and a fuel inlet 28, respectively. A sliding seat air control valve 27 controls the flow of air through the burner air inlet 26, whilst a fuel control valve 29 controls the flow of fuel through the fuel inlet 28. A pair of air/fuel conduits 30, 32 connect the air/fuel burner 24 with the first and second exhaust pipes 16, 18.

Each exhaust pipe 16, 18 includes a venturi section 34, 36 adjacent where the air/fuel conduits 30, 32 enter the exhaust pipes. Downstream of the venturi sections 34, 36 in each pipe 16, 18 is a reactor vessel 38, 40. Each reactor vessel 38, 40 is of a generally tubular shape and has an internal chamber 42, 44. The external surface of each tubular vessel 38, 40 lies against the internal surface of its respective exhaust pipe 16, 18. The vessels 38, 40 also have an internal surface which defines a passage through which the exhaust gases flow. The internal surface of each vessel 38, 40 includes a plurality of fins 43 which extend inwardly towards the centre of the exhaust gas pipe. The fins 43 act as a heat exchanger, transferring heat from the exhaust gas to the contents of the chambers 42, 44. Consequently, exhaust gases can flow through the centre of each vessel 38, 40 and impart heat to the contents of each tubular chamber 42, 44. The chamber 42, 44 of each reactor 38, 40 contains a mixture of salt and a refrigerant fluid. Examples of suitable mixtures include lithium chloride (LiCl) in water, or lithium bromide (LiBr) in methanol.

The chamber 42, 44 of each reactor 38, 40 is in fluid communication with a first three-way control valve 46 which controls flow of refrigerant vapour from the chambers to the remainder of the system, as will be described in more detail below. A second three-way control valve 48 controls the flow of vapour back into the chambers 42, 44. The chambers 42, 44 are selectively in fluid communication with a condenser 50 via a first conduit 49, depending upon whether the first control valve 46 is open or closed. A condenser fan 52 may selectively draw ambient air over the condenser 50 in order to condense the refrigerant vapour.

The condenser 50 is in fluid communication with an evaporator 54 via a second conduit 53, which includes a third control valve 51 which controls the flow of fluid between the condenser and the evaporator. The evaporator 54 is locatable within the cab, or interior, 56 of the vehicle as represented schematically in FIG. 1. An evaporator fan 58 may selectively draw ambient air from outside the cab 56 over the evaporator 54. A heater 60 is also provided adjacent the evaporator 54 within the cab 56. The heater 60 is in fluid communication with a suitable heat source (e.g. engine coolant), with the flow of fluid into the heater controlled by a proportional heater control valve 62. A heater controller 63 is provided, either inside or outside the cab 56, which controls the heater control valve 62 and evaporator fan 58 in response to requests made by the operator in the cab via in-cab heater controls (not shown). A third conduit 64 fluidly connects the evaporator 54 with the reactor chambers 42, 44 when the second control valve 48 is open and the third control valve 51 is closed.

An electronic control unit (ECU) 70 is also provided, which may control operation of the exhaust air inlets 20, 22 and the air and fuel inlet valves 27, 29 of the air/fuel burner 24. The ECU 70 may also control the first, second and third control valves 46, 48, 51. Control of the ECU 70 (and hence the various valves) can be effected manually by an operator via a control interface (not shown) or else automatically in accordance with one or more programs stored on a memory (not shown) in communication with the ECU 70.

Figure 2:
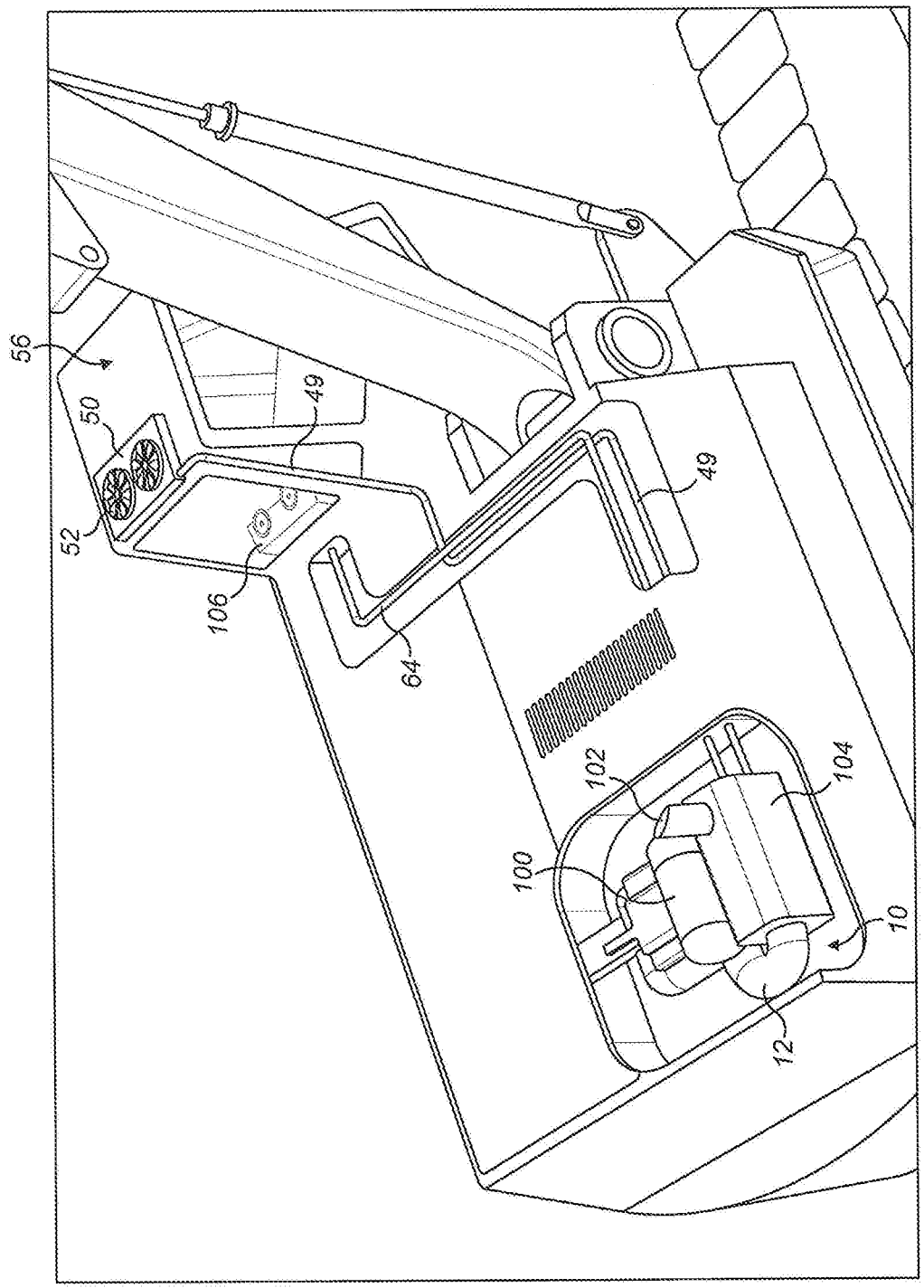
FIG. 2 is an illustration of the system of FIG. 1 in situ on a vehicle.

FIG. 2 shows the system of FIG. 1 when installed on a vehicle. In this example, the vehicle is a work machine in the form of a hydraulic excavator, but it should be understood that the invention may equally be utilised in other vehicles such as cars, on- and off-highway trucks and agricultural tractors, for example. In the excavator shown the engine 100 is towards the rear of the vehicle body. The exhaust conduit 10 runs from the exhaust outlets (not shown) of the engine 100 to a tail conduit 102, which extends upwardly out of the vehicle body. Between the exhaust conduit inlet 12 and the tail conduit 102 is a housing 104 which contains the exhaust pipes 16, 18 and the reactors 38, 40, the latter two being hidden from view by the housing 104 in FIG. 2.

As can be seen from the cut-away sections of the body, the first conduit 49 connects the reactors 38, 40 with the condenser 50, which in this example is located on the roof of the cab 56 along with a pair of condenser fans 52. The second conduit connecting the condenser 50 and the evaporator 54 is not visible in FIG. 2, likewise the evaporator and heater 60 which are packaged within an air conditioning unit 106 inside the cab 56. The third conduit 64 which connects the evaporator 54 back to the reactors 38, 40 can be seen thanks to the cut-away section of the body.

INDUSTRIAL APPLICABILITY

The method in which the system shown in FIGS. 1 and 2 operates will now be described. Prior to the engine of the vehicle being started and exhaust gases beginning to flow in the exhaust conduit 10, the chambers 42, 44 of the reactors 38, 40 will contain the salt which will have absorbed the refrigerant. After the engine starts, hot exhaust gases will begin to flow through the pipes 16, 18 of the exhaust conduit 10. As they do so, the hot gases pass over the inwardly extending fins 43 of the reactors 38, 40 and heat is transferred from the gases to the contents of the chambers 42, 44 via the fins. As the "wet" salt in the chambers 42, 44 heats up the refrigerant is vaporised. As the refrigerant is vaporised, the ECU 70 will open the first control valve 46 and the vapour will flow along the first conduit 49 into the condenser 50. The salt left behind in the reactor chambers 42, 44 will be "dry", that is substantially free of refrigerant.

As the refrigerant vapour passes through the condenser 50 it condenses to liquid as it is cooled by ambient air which is drawn over the condenser coil by way of the condenser fan 52. The open third control valve 51 allows the condensate to flow under gravity through the second conduit 53 from the condenser 50 to the evaporator 54. As the liquid refrigerant flows into the evaporator 54 it cools the ambient air being drawn over the evaporator by the evaporator fan 58. Depending on the heating/cooling setting requested by the operator, the heater controller 63 may instruct the heater control valve 62 to allow fluid to flow from the heat source into the heater in order to achieve the desired level of heating or cooling within the cab.

As the air passing over the evaporator 54 into the cab 56 is cooled the liquid refrigerant once again evaporates. The ECU 70 closes the third control valve 51 and opens the second control valve 48, thereby allowing the vapour to flow back to the reactor chambers 42, 44 via the third conduit 64. As the vapour re-enters the chambers 42, 44 it condenses and is absorbed back into the salt. To assist with the cooling of the reactors 38, 40 and condensing of the refrigerant vapour therein, the ECU 70 may open one of the exhaust air inlets 20, 22 in order to draw ambient air across the fins 43 of the reactors instead of exhaust gas. When either air inlet 20, 22 is open the respective venturi section 34, 36 within the exhaust pipe 16, 18 acts to draw more air through the inlet 20, 22 into the pipes and increase the mass flow rate of the air across the fins 43. In contrast, if the reactors 38, 40 need to be heated further the control valves 27, 29 of the air/fuel burner 24 can be instructed by the ECU to introduce an air/fuel mixture into the exhaust pipes 16, 18 in order to increase the temperature of the exhaust cases as the air/fuel mixture is burnt in the exhaust flow. Alternatively, the ECU 70 may instruct just the air control valve 27 of the air/fuel burner 24 to open so as to introduce further ambient air into the exhaust pipes 16, 18 in order to assist with the cooling of the reactors 38, 40.

The present invention benefits from having the reactors located directly in the exhaust gas flow within the exhaust pipe. Doing so ensures a high level of exhaust to reactor Coefficient of Performance due to high efficiency of energy transfer from exhaust flow to the reactor(s). Where the exhaust air inlet(s) and/or air/fuel burner are included in the system, the present invention ensures that the temperature within the exhaust pipe, and hence across the reactor(s), can be quickly adjusted thanks to the selectively operable exhaust air inlets and the air/fuel burner feeding air and/or an air/fuel mixture into the pipe(s). When an exhaust air inlet is open the venture section within the exhaust pipe enhances the cooling effect provided by drawing additional airflow across the reactor.

A further benefit of including the air/fuel burner is that the system can operate during engine off conditions, with the reactors being heated or cooled depending on whether the burner is instructed by the ECU to introduce an air/fuel mixture or purely air. System performance can also be augmented during operation through control of the air and fuel control valves of the air/fuel burner.

The reactors also have an energy storage capability which enables the functionality of the system to be maintained for a predetermined time during engine off conditions without the needing to enable the air/fuel burner unit. Finally, the components of the system can be retro-fitted to a HVAC system of a vehicle without needing to significantly alter the architecture and layout of existing condenser and evaporator components of the existing system.

Although the preferred embodiment of the present invention includes an exhaust conduit having two pipes in parallel, it should be understood that the present invention may only include one exhaust pipe containing an exhaust air inlet, venturi section and reactor vessel.

Although both are present in the preferred embodiment of the invention, it should be understood that the system may only employ one of the exhaust air inlet and air/fuel burner. Indeed, the system may do without exhaust air inlets and/or an air/fuel burner altogether.

Whilst the reactor vessel is preferably tubular, it is not limited to such a shape or be of annular cross section. For example, the reactor may have a square, triangular or rectangular cross section with a central passage extending longitudinally through the reactor. In such a case, exhaust flow may be direct along internal and external surfaces of the vessel.

The air/fuel burner may be adapted so that it can vary the air/fuel ratio being introduced from the burner into the at least one exhaust pipe.

These and other modifications and improvements may be incorporated without departing from the scope of the present invention.

The invention claimed is:

1. A heating and cooling system for a vehicle having an internal combustion engine, the system comprising:
   at least one exhaust pipe conveying exhaust gases away from the internal combustion engine;
   a reactor vessel located in the exhaust pipe and containing an absorbent salt and a refrigerant fluid;
   a condenser in fluid communication with the reactor vessel, the condenser receiving refrigerant vapour from the reactor when exhaust gases heat the reactor vessel in the exhaust pipe;
   an evaporator in fluid communication with the condenser and the reactor vessel, the evaporator receiving condensed refrigerant from the condenser so as to cool the air surrounding the evaporator, and returning refrigerant vapour to the reactor vessel, wherein when installed, the evaporator is disposed in a cab of the vehicle;
   an air/fuel burner in fluid communication with sources of air and fuel, the air/fuel burner selectively operable in a first mode to introduce air from a burner air inlet through an air control valve and selectively operable in a second mode to introduce an air/fuel mixture by introducing both air from the burner air inlet through the air control valve and fuel from a fuel control valve into the at least one exhaust pipe upstream of the reactor vessel; and
   an exhaust air inlet in the at least one exhaust pipe upstream of the reactor vessel, the exhaust air inlet being movable between closed and open positions to selectively allow ambient air to be drawn into the exhaust pipe, wherein an electronic control unit controls operation of the air control valve and the fuel control valve to operate the air/fuel burner in the first mode and the second mode.

2. The system of claim 1, wherein the salt is selected from the group comprising lithium chloride and lithium bromide, and the refrigerant is selected from the group comprising water and methanol.

3. A vehicle comprising:
   an internal combustion engine; and
   a heating and cooling system in accordance with claim 1.

4. The system of claim 1, further comprising a heater, wherein when the heater is installed, the heater is disposed in the cab of the vehicle adjacent the evaporator, the heater having a heater control valve which controls the flow of a heating fluid to the heater from a heat source.

5. The system of claim 4, wherein the heating fluid is coolant from the internal combustion engine of the vehicle.

6. The system of claim 1, further comprising a venturi section in the at least one exhaust pipe between the exhaust air inlet and the reactor vessel.

7. The system of claim 6, wherein the system comprises a pair of exhaust pipes conveying exhaust gases away from the internal combustion engine, each exhaust pipe containing a reactor vessel in fluid communication with the condenser, and exhaust air inlet and a venturi section between the exhaust air inlet and the reactor vessel.

8. The system of claim 6, further comprising an air/fuel conduit adjacent to the venturi section, wherein the air or the air/fuel mixture is introduced to the exhaust pipe via the air/fuel conduit.

9. The system of claim 1, wherein the electronic control unit actuates the air/fuel burner and/or exhaust air inlet to heat or cool the reactor vessel.

10. The system of claim 1, wherein the reactor is a tubular vessel having an external surface which lies against the internal surface of the at least one exhaust pipe, and has an internal surface which defines a passage through which the exhaust gases flow.

11. The system of claim 10, wherein the internal surface of the reactor vessel comprises a plurality of fins extending inwardly towards the centre of the passage, the fins transferring heat from exhaust gases within the exhaust pipe to the salt and refrigerant within the reactor vessel.

12. A method of cooling a driver environment of a vehicle having an internal combustion engine, the method comprising the steps of:

providing at least one exhaust pipe for conveying exhaust gases away from the internal combustion engine;

disposing a reactor vessel in the exhaust pipe, the reactor vessel containing an absorbent salt and a refrigerant fluid;

fluidly connecting a condenser to the reactor vessel, such that the condenser receives refrigerant vapour from the reactor vessel when exhaust gases heat the reactor vessel in the exhaust pipe;

disposing an evaporator in the driver environment of the vehicle;

fluidly connecting the evaporator to the condenser and the reactor vessel, such that the evaporator receives condensed refrigerant from the condenser and cools the air surrounding the evaporator, and subsequently returns refrigerant vapour to the reactor vessel;

selectively introducing air in a first mode and an air/fuel mixture in a second mode into at least one exhaust pipe upstream of the reactor vessel from an air/fuel burner in fluid communication with sources of air and fuel, wherein when operating in the first mode, the air is introduced from a burner air inlet through an air control valve and when operating in the second mode, the air is introduced from the burner air inlet through the air control valve and the fuel is introduced from a fuel inlet; and moving an exhaust air inlet between a closed and an open position to selectively allow ambient air to be drawn into the exhaust pipe via the exhaust air inlet in the at least one exhaust pipe upstream of the reactor vessel to selectively allow ambient air to be drawn into the exhaust pipe.

13. The method of claim 12, wherein the air or the air/fuel mixture is introduced to the exhaust pipe via an air/fuel conduit that is disposed adjacent to a venturi section in the at least one exhaust pipe between the exhaust air inlet and the reactor vessel.

\* \* \* \* \*